United States Patent
Putt et al.

(10) Patent No.: US 6,613,424 B1
(45) Date of Patent: *Sep. 2, 2003

(54) COMPOSITE STRUCTURE WITH FOAMED CEMENTITIOUS LAYER

(75) Inventors: Dean L. Putt, Lititz, PA (US); Peter A. Christie, Lancaster, PA (US); Andrea M. Moser, Millersville, PA (US); Marsha Stalker Bischel, Lancaster, PA (US); Anthony L. Wiker, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 42 days.

This patent is subject to a terminal disclaimer.

(21) Appl. No.: 09/663,288

(22) Filed: Sep. 15, 2000

Related U.S. Application Data

(60) Provisional application No. 60/157,269, filed on Oct. 1, 1999, and provisional application No. 60/157,301, filed on Oct. 1, 1999.

(51) Int. Cl.[7] .............................. B32B 3/26; E04B 1/84
(52) U.S. Cl. ............................. 428/312.4; 428/307.3; 428/310.5; 428/312.2; 428/317.9; 428/318.4; 428/319.1; 428/703; 181/284; 181/285; 181/286; 181/287; 181/290; 181/293; 181/294; 181/295; 106/122; 106/713; 521/83; 521/100
(58) Field of Search ............................ 428/307.3, 312.2, 428/317.9, 312.4, 318.4, 310.5, 319.1, 703; 181/294, 286, 284, 285, 287, 290, 293, 295; 106/122, 713; 521/83, 100

(56) References Cited

U.S. PATENT DOCUMENTS

| | | |
|---|---|---|
| 3,444,956 A | 5/1969 | Gaffney .................... 181/33 |
| 3,542,640 A | 11/1970 | Friedberg et al. ............ 162/101 |
| 3,819,388 A | 6/1974 | Cornwell ...................... 106/86 |
| 3,871,952 A | 3/1975 | Robertson .................... 162/101 |
| 4,031,285 A * | 6/1977 | Miller et al. ................ 428/294 |
| 4,042,745 A | 8/1977 | Cornwell et al. ........... 428/310 |
| 4,488,932 A | 12/1984 | Eber et al. ...................... 162/9 |
| 4,551,384 A | 11/1985 | Aston et al. ............. 428/312.6 |
| 4,613,627 A | 9/1986 | Sherman et al. .............. 521/68 |
| 4,636,444 A | 1/1987 | Lombardozzi .............. 428/596 |
| 4,702,870 A | 10/1987 | Setterholm et al. ........... 264/87 |
| 4,899,498 A | 2/1990 | Grieb .......................... 52/144 |
| 5,085,929 A | 2/1992 | Bruce et al. ............. 428/309.9 |
| 5,109,030 A * | 4/1992 | Chao et al. .................... 521/83 |
| 5,250,578 A | 10/1993 | Cornwell ...................... 521/83 |
| 5,277,762 A | 1/1994 | Felegi, Jr. et al. .......... 162/145 |
| 5,395,438 A | 3/1995 | Baig et al. .................. 106/214 |
| 5,612,385 A | 3/1997 | Ceaser et al. .................. 521/68 |
| 5,720,851 A | 2/1998 | Reiner ........................ 162/101 |
| 5,824,148 A | 10/1998 | Cornwell ..................... 106/678 |
| 5,948,157 A * | 9/1999 | McKenney et al. ......... 106/711 |
| 6,152,394 A * | 11/2000 | Sakata et al. ................ 242/388 |

* cited by examiner

*Primary Examiner*—Terrel Morris
*Assistant Examiner*—Hai Vo
(74) *Attorney, Agent, or Firm*—Womble Carlyle Sandridge & Rice, PLLC

(57) ABSTRACT

The present invention provides for an acoustically absorbent porous panel that is both rigid and resistant to sagging caused by moisture. The acoustically absorbent porous panel is comprised of at least two layers. The first layer is a facing layer formed from a cured aqueous foamed cementitious material. The foamed cementitious material comprises on a wet basis about 53% to about 68% by weight cement, about 17% to about 48% by weight water, about 0.05% to about 5% by weight fiber, and about 0.01% to about 10% by weight surfactant. Additionally, pores distributed within the cured material comprising about 75% to about 95% by volume of the material. The second layer is a backing layer that is affixed to the facing layer.

36 Claims, 2 Drawing Sheets

COMPOSITE STRUCTURE WITH FOAMED CEMENTITIOUS LAYER

This application claims the benefit of U.S. Provisional Application Nos. 60/157,269, and 60/157,301, each filed Oct. 1, 1999.

FIELD OF THE INVENTION

The present invention relates to a composite material and method of manufacture, wherein the composite material employs the use of a cementitious foam as a laminate layer within a multi layer panel to achieve improved acoustical and surface durability for use as an acoustic panel.

BACKGROUND OF THE INVENTION

Conventional composite acoustic panels comprise a number of components to achieve sufficient structural rigidity and sound absorption. Many conventional acoustic panels contain mineral wool, perlite, and newsprint as primary ingredients. Such ingredients are typically wet formed from aqueous slurries using an organic binder such as a starch. Mineral wool may be comprised of fibers of rock wool or basalt. Additionally, glass fibers in combination with the mineral wool or glass fibers alone may be utilized. Typically, the slurry may either be wet formed upon a continuous moving screen, within a mold or directly onto a scrim material. A typical composite acoustical panel may also include backing materials and facing materials. One typical backing material includes kraft paper and the facing material is typically a latex paint providing acoustic permeability with aesthetic appeal.

Acoustic panels with a fiberglass batting typically include a kraft paper backing laminated to one face of the fiberglass batt with latex paint applied to the another. The fiberglass batt essentially consists of a pre-cut blank or solid of randomly arranged glass fibers bound together with an organic binder. Unfortunately, such fiberglass battings tend to lack surface integrity and rigidity.

Acoustical panels containing starch, newsprint, mineral wool and perlite are bound together by the starch, which is highly water-soluble. Such acoustic panels containing starch as a binder are susceptible to atmospheric moisture since when starch is partially hydrolyzed it loses a portion of its ability bind the ingredients of the panel. Such susceptibility to humid conditions tends to lead to warping or sagging of the panel.

Therefore, there is a need for an acoustic ceiling panel having sufficient rigidity and resistance to sag in a moist atmosphere.

SUMMARY OF THE INVENTION

The present invention provides for an acoustically absorbent porous panel that is both rigid and resistant to sagging caused by moisture. The acoustically absorbent porous panel is comprised of at least two layers. The first layer is a facing layer formed from a cured aqueous foamed cementitious material. The foamed cementitious material comprises on a wet basis about 53 to 68% by weight cement, about 17% to about 48% by weight water, 0% to about 10% by weight calcium silicate, about 0.05 to 5% by weight fiber, and about 0.01 to 10% by weight surfactant. Acoustically absorbent panels have pores distributed within the cured material comprising about 75 to 95% by volume of the material. The second layer is a backing layer that is affixed to the facing layer.

Additionally, a process is provided for producing an acoustically absorbent porous panel by producing a foamed cementitious composition by the steps of: 1) aerating a foam cementitious mixture, comprised of between about 53% and about 68% by weight cement, between about 17% and about 48% by weight water, between 0% and about 10% by weight calcium silicate, between about 0.05% and about 5% by weight synthetic organic fibers and between about 0.01% to about 10% by weight surfactant, 2) applying the foamed cementitious composition to a backing composition, 3) then curing the composition on the backing.

The present invention provides for an acoustically absorbent porous panel comprising a facing layer formed from a cured aqueous foamed cementitious material. The cured aqueous foamed cementitious material is comprised of cement, fibers and surfactant. The cured aqueous foamed cementitious material also has a density between about 10 and 40 lb/ft$^3$, a Hess rake finger scratch test result of at least 12, an indentation of less than 0.12 inches, a Noise Reduction Coefficient of at least 0.5, and a sag test result of less than 0.15 inches at 90% RH. Then a backing layer is affixed to the facing layer.

These and other aspects of the present invention will become apparent upon reading the following specification, when taken in conjunction with the accompanying drawings.

BRIEF DESCRIPTION OF THE DRAWINGS

The invention may more clearly be understood by referring to the drawings of the description that follows.

DETAILED DESCRIPTION OF THE INVENTION

Figure 1:
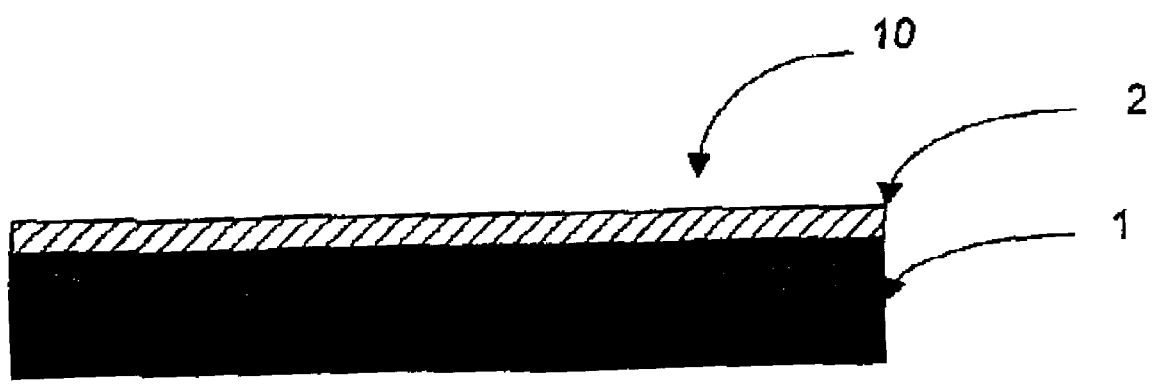
FIG. 1 represents a schematic cross section of an acoustic panel according to the present invention.

The present invention relates to a shaped acoustical panel having a facing and backing layer. The backing layer is adapted to absorb acoustic energy and the facing layer is comprised of a foamed cementitious layer applied to the backing material wherein the foam imparts a surface integrity and an improved sag resistance to the acoustic panel. More specifically, the backing layer may include a preformed fiberglass batt or a preformed panel of mineral and organic fibers bound together with a typical binder, such as starch. The backing layer may function as a carrier for the foamed cementitious material during the manufacturing process.

The inventive process may comprise the steps of creating a dry mixture of cement and fibers. The dry cement fiber mixture is sufficiently mixed to uniformly disperse the fibers within the mixture. A second step includes adding a surfactant solution to the dry cement and fiber mixture to wet all the ingredients. The cement-surfactant-fiber mixture is whipped until sufficiently foamed. A final phase of the mixing process includes a low-shear-mixing step to disperse clumps of fiber that may occur during the previous mixing step. The fibers may be synthetic organic fibers, such as polyester fibers.

The formulation of the foamed cementitious material in uncured, wet weight percentages may include about 53% to about 68% cement; about 17% to about 48% water; about 0.05% to about 5% fibers; and about 0.01% to about 10% surfactant. Other formulations for the foamed cementitious material in uncured, wet weight percentages may include about 54% to about 61% cement; about 32% to about 44% water; about 0.1% to about 3% fibers; and about 0.5 to about 5% surfactant. Additionally, the foamed cementitious material in uncured, wet weight percentages may include about 56% to about 61% cement; about 32% to about 42% water; about 0.28% to about 1.3% fibers; and about 0.7% to about 2% surfactant.

In an embodiment, applicants have found that having the surfactant solution at temperatures between about 41° F. and about 168° F. achieves a maximum foaming of the cement composition during the mixing process. In an alternative embodiment the diluted surfactant solution can be mixed at temperatures between about 58° F. and about 142° F. and between about 68° F. and about 92° F.

After completing the final mixing step in the formation of the foamed cementitious composition, the foamed cementitious material may be applied as a thin layer to the surface of the backing material. A final step includes curing the cementitious layer on the backing material to create the final product. The foamed cementitious facing material of the panels has a Hess rake finger scratch test value of about 12 or greater. When the surface of the facing material is coated with an organic coating, such as paint, the value is typically at least 16 and can be as great as at least 22 when two coats of paint are applied to the panel. Typically, the average is between about 12 and about 14 for the uncoated material and between about 16 and about 18 for the material with a single coat of paint.

The Hess rake finger scratch test consists of "raking" various thicknesses of "feeler" gauge (spring steel) stock across the face or edge of a ceiling tile or panel. The measure is the highest "feeler" gauge thickness (in thousandths of an inch) that does not damage the test material. The metal tongues or fingers are securely arranged evenly in a row and each has a protruding length of approximately 1.875 inches. The thickness of the tongues increases from one end of the row to the other end. The tongue thicknesses are 10, 12, 14, 16, 18, 20, 22, and 25 mils with corresponding increase in stiffness. The sample is placed in a holder below the set of tongues with the sample flange lower than the cutout forming the flange. The tongues are allowed to overlap across the top edge of the sample with the bottom of the tongue a distance of approximately 7/32 inches below the surface of the sample in the cutout forming the flange. The tongues are then drawn across the sample at a speed of 20 inches per minute. The thicker tongues will cause a scratch more easily and damage the edge more easily than the thinner tongues.

Additionally, hardness can be determined as a function of compression resistance as set forth in ASTM C 367. The test was modified by the use of a 1-inch ball, 30-lbs force and a cross head speed of ½ inch/min. The facing material typically has a compression resistance of less than 0.12 inches. In an alternative embodiment, the compression resistance can be less than 0.1 inches and in a second embodiment the compression resistance can be less than 0.08 inches.

The resulting foamed cementitious facing material has a density between about 10 lbs/ft$^3$ and about 40 lbs/ft$^3$. In an alternative embodiment the material can have a density between about 15 lbs/ft$^3$ and about 35 lbs/ft$^3$ or between about 20 lbs/ft$^3$ and about 30 lbs/ft$^3$. The resulting foamed cementitious facing material is relatively resistant to moisture. This can be quantified as a value determined from a sag test. The following are approximate four-cycle sag test ranges for various embodiments. Each cycle consists of subjecting the 2 ft by 2 ft sample to 17 hours at 82° F. and 90% RH followed by 6 hours at 82° F. and 35% RH. In one embodiment, at 90% RH there is typically a resulting sag of less than 0.15 inches. In a second embodiment, at 90% RH there is typically a resulting sag of less than 0.1 inches. In a third embodiment, at 90% RH there is typically a resulting sag of less than 0.05 inches.

Acoustical absorption by the panels is a function of sound energy that is both reflected in part and absorbed in part. Absorption usually takes place in either of two ways, transmission through the panels or conversion of the acoustic energy into heat by the panel material. The amount of sound energy absorbed by a material is determined by a standardized test procedure ASTM C423-90a entitled "Standard Test Method for Sound Absorption and Sound Absorption Coefficients by the Reverberation Room Method". Absorption is expressed as the ratio of the sound energy absorbed to the sound energy incident to the panel surface. This ratio is called the absorption coefficient, usually denoted as A. The more sound energy absorbed, the closer this coefficient is to 1.0. Thus, when A=0, no sound energy is absorbed and all incident sound energy is reflected. Conversely, when A=1.0, all the sound energy is absorbed and none of the incident energy is reflected. The sound absorbing properties of materials vary with frequency and with transmission loss. Sound absorption data is stated as a function of ⅓ octave frequency bands for 100 to 5000 Hz. Sound absorption data is often combined into a single number called the Noise Reduction Coefficient, which is obtained from the average value of A at 250, 500, 1000 and 2000 Hz rounded to the nearest multiple of 0.05. The higher the NRC value, the greater the average sound absorption in this frequency range.

The acoustically absorbent porous panels of this invention have a Noise Reduction Coefficient of greater than 0.5. In an additional embodiment, the panels have a NRC of greater than 0.6 and in a further embodiment the panels have a NRC of greater than 0.7.

Although the foamed cementitious layer may have any thickness, in an embodiment, the foamed cementitious layer may be from about one eighth of an inch up to about two inches thick. Additionally, in an embodiment the foamed cementitious composition may include hydraulic cement including, but not limited to, portland, sorrel, slag, fly ash or calcium alumina cement. Additionally, the cement may include a calcium sulfate alpha hemihydrate or calcium sulfate beta hemihydrate. Another embodiment might utilize natural, synthetic or chemically modified beta gypsum as an alternative to portland cement or alpha gypsum. Additionally, the inventive cementitious composition may include mixtures of the above-referenced cement ingredients. For example, the invention may comprise a mixture of calcium alumina cement and portland cement to give a faster set time.

The cementitious material also includes a surfactant solution for the purpose of creating foam from the cementitious material during the mixing process. The foaming effect within the cement is important because it allows the creation of an open porous structure within the cement to improve acoustic absorption performance of the cement. Synthetic organic fibers can be included within the foamed cementitious mixture to increase the modulus of elasticity. Examples of such fibers may include, but are not limited to, polyolefin, polyamide and polyester fibers. The foam cement may also include additional additives to increase handleability and resistance to indention or impact damage. Examples of additives that would contribute to the overall hardness of a foamed cement would generally include calcium compounds or silica.

More specifically, FIG. 1 illustrates a schematic representation of a cross section of an acoustic panel 10 in conjunction with the present invention. The panel essentially comprises a main fiber portion 1 that receives the foamed cementitious layer 2.

In an embodiment, the foamed cementitious layer is approximately one-eighth of an inch thick up to about two inches thick and is cast on to backing 1. The backing layer 1 may be comprised of paper, or felt, webs or batts of fiberglass, or typical wet formed mineral fiberboard. The backing 1 should be sufficiently strong to function as a carrier through the production process. The foamed layer 2 provides acoustic, durable, water-resistant and fire-resistant properties to the backing 1. The foamed layer 2 is also sufficiently porous to allow for sound absorption without the need for additional perforations to the surface. Additionally, the composite structure having a foamed cementitious layer can be production and field cut with conventional utility knife as opposed to solid cement that requires the use of carbide-or diamond-tipped saws. The foamed cementitious layer 2 may include a hydraulic cement, such as portland cement, gypsum cement, sorrel cement, slag cement, fly ash cement, calcium alumina cement, or any mixture of the above-referenced cements. For example, a mixture of calcium alumina cement and portland cement may be needed to give a faster set time to the porous cementitious foamed layer 2. The gypsum cement may be calcium sulfate alpha hemihydrate, calcium sulfate beta hemihydrate, or mixtures thereof.

A surfactant is included for the purpose of creating the foam during a mixing process. Surfactants may include amphoteric, anionic, and nonionic moieties. More specifically, the moieties described above may include a hydrophobic portion containing approximately 8 to 20 carbons.

Amphoteric moieties include betaines, sultaines, and propionates. An embodiment may include amphoteric moieties based on coconut oils such as cocamidopropyl betaine, cocamidopropyl hydroxysultaine, and cocoamphopropionate. An anionic moieties include sodium salts of a sulfoxal functional group such as sulfate or sulfosuccinate. For example, such anionic moieties may include alkyl benzene sulfonate, sodium lauryl ether sulfate, disodium cocamide diethylamine, disodium cocamido methylethylamine sulfosuccinate, disodium cocamido methylisopropylamine sulfosuccinate, disodium deceth-6 sulfosuccinate, disodium dimethicone copolyol sulfosuccinate, disodium laureth sulfosuccinate, and disodium nonxynol-10 sulfosuccinate. Nonionic surfactants include moieties of ethoxylate and amine oxide such as, ethoxylated alkyl phenol, cocoamine oxide, lauramine oxide, myristamine oxide, oleamine oxide, and cocamidopropylamine oxide.

A preferred surfactant for use with portland cement composition is disodium laureth sulfosuccinate. The surfactant suspends the particles of cement during the hydration process. Suspension properties of the other surfactants also perform to a sufficient degree. However, some other surfactants are more tolerant in combination with accelerators such as carbonates and bicarbonates. For the purposes of foaming calcium sulfate alpha hemihydrate, the preferred surfactant is an ethoxylated alkyl phenol with a hydrophobic molecular portion containing 8 to 13 carbons. This nonionic surfactant produces similar particle suspension properties for the gypsum.

The foamed cementitious layer may also include fibrous materials for improving its strength properties. More specifically, such strength properties may include moduli of rupture and elasticity. Such fiber materials may include synthetic organic fibers including, but not limited to, polyolefin, polyaramide and polyester fibers. The fibers may also be crimped. Inorganic fibers in the foamed cement composition may include, but are not limited to, fiberglass, mineral wool and wollastonite. In an embodiment, the synthetic organic fibers may be about one quarter to about three quarters of an inch long with a preferred length of about one half inch and with a diameter of about 0.0005 inches to about 0.007 inches in diameter.

The foamed cementitious composition may also include additives that contribute to the overall hardness of the foamed cement. Such a degree of cement hardness is desired to improve handleability and to improve resistance to indentation and impact damage. Additives that may contribute to the overall hardness of portland cement generally contain calcium compounds and/or silica. Examples of calcium-based hardeners include calcium oxide, calcium hydroxide and carbonates. Silica additives may include sodium silicate, mica, finely ground sand, and certain ashes high in silica content such as, rice hull ash and fly ash. In an embodiment, an additive to improve strength and maintain foam density is wollastonite or calcium silicate. Fibrous grades known as Nyad G or Orleans One work well.

Figure 2:
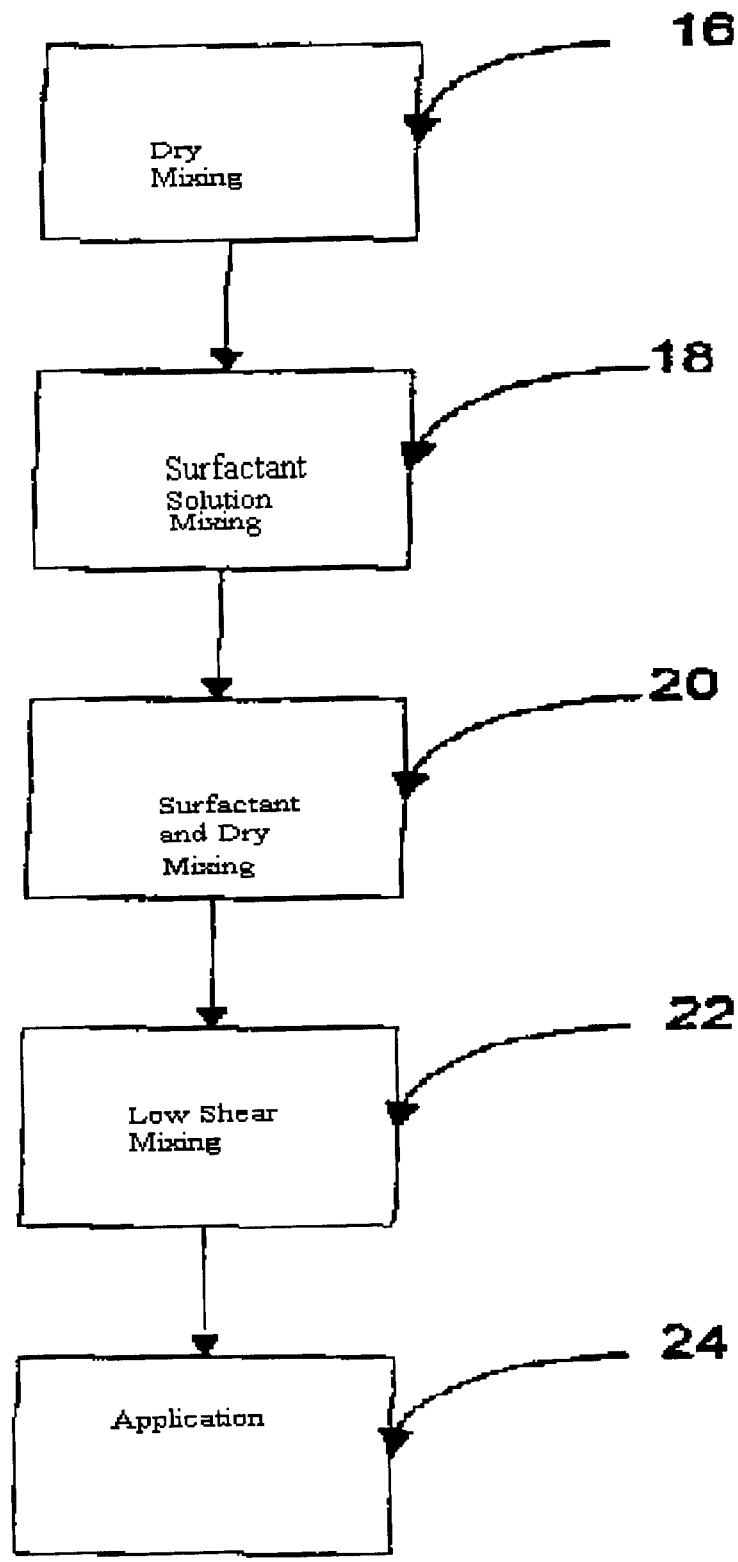
FIG. 2 represents a flow chart of a method for carrying out the process of the invention.

The process involves a two step mixing process to obtain the desired properties of the foamed cementitious layer. In a first step 16, as is shown in FIG. 2, all dry ingredients are thoroughly mixed together so as to disperse all fibers evenly within the cement mix. In a second step 18, a surfactant solution is prepared. In a third step 20, the surfactant solution is added to a dry mix to create a foam by utilizing a high-speed whipping technique until the cement has sufficiently foamed. In a fourth step 22, a secondary low shear mixing operation redisperses fibers which tend to ball up during the high speed mixing stage. The low shear mixing operation preferably utilizes a low shear paddle mixer similar to that used with spackling and plaster mixing to disperse clumps of polyester fiber. In a final step 24, the foamed cementitious mixture is applied to a top surface of the backing material 1 and allowed to harden.

The present invention may include in the foamed cement a portland cement mixture comprising of approximately 53% to approximately 68% by weight portland cement, approximately 17% to approximately 48% by weight water, approximately 1% to approximately 5% by weight calcium silicate and approximately 1% to approximately 5% by weight surfactant. Additionally, the above-referenced portland cement mixture may comprise approximately 0.05% to approximately 5% by weight synthetic organic fibers. However, fibers are not absolutely necessary to accomplish the objectives of the present invention. More specifically, the above-referenced portland cement mixture may comprise most preferably approximately 31% to approximately 42% by weight water.

In another embodiment of the present invention the foamed cement is material may comprise calcium sulfate alpha hemihydrate cement. More specifically, the above-referenced mixture may include approximately 53% to approximately 68% by weight calcium sulfate alpha hemihydrate cement, approximately 20% to approximately 48% by weight water, and approximately 0.04% to approximately 1% by weight surfactant. In addition, the calcium sulfate alpha hemihydrate cement may also include approximately 0.006% to approximately 0.6% by weight synthetic organic fibers. Most specifically, water within the calcium sulfate alpha hemihydrate cement mixture is approximately 35% to approximately 40% by weight. All weight percentage mixtures referred to in this specification are weight percentages of the foamed cement composition prior to curing.

The following example below illustrates one particular embodiment of the present invention. The example is given for illustrative purposes only and is not meant to limit the scope of the invention as disclosed herein in any way.

In a first operation of the above-referenced application, a mixture comprising approximately 53% to approximately 68% by weight of portland cement, approximately 31% to approximately 37% by weight water, approximately 3% Nyad G, a surfactant solution which comprised approximately 0.04% to approximately 1.0% by weight of the total mixture and approximately 1% by weight polyester fiber was prepared. The above-referenced weight percentages are for the uncured cement mixture. Applicants first combined all dry ingredients for uniform dispersion of the polyester fiber. Applicants then added the surfactant solution to the dry mix to wet and combine all ingredients. Applicants then whipped the mixture of fiber, cement, water, and surfactant mixture at a high speed with a wire whisk for approximately one to three minutes until the cement fiber mix foamed. Applicants then initiated a secondary, low shear mixing operation to disperse polyester fibers that may ball up during the high speed mixing cycle. In the secondary low shear mixing operations, applicants utilized a low shear paddle mixer which is similar to those used with spackling and plaster mixing to disperse the clumps of polyester fiber. Applicants mixed the foam cement at a low speed until just before the foam begins to collapse. Applicants applied the foam cement to the substrate layer and in a final step cured the uncured foamed cement to complete the process of forming a foamed cement faced acoustic panel.

In the preparation of the surfactant solution applicants have found that maximum foaming of the portland cement occurs when the surfactant solution is prepared between about 68° F. and about 100° F., with the temperature of approximately 90° F. being optimal. Applicants have also determined that a deviation in water temperature from the optimum temperature range will increase the density of the foam by a factor of about 5 pounds per cubic foot for every 10 degrees Fahrenheit deviation. Thus, it is advantageous to keep the surfactant water solution temperature at approximately 90° F., with an outer range between about 41° F. and about 168° F.

A strong adhesive bond is obtained when the foamed cementitious layer is applied to fiberglass or similar fibrous substrate due in part to the mechanical adhesion of the fibers on the surface of the substrate. When the foamed cementitious layer is applied to a conventional mineral fiber board, especially one that has been smooth sanded, the adhesion between the foamed cementitious layer 2 and the backing 1 is not as strong as compared to the fiberglass composite. It was determined that adhesion may be improved by either mechanical treatment or chemical primers or both to backing 1. Texturing, perforating, fissuring and other methods known to those skilled in the art may be carried out on the backing 1, for the purpose of creating mechanical adhesion sites, prior to applying the foamed cementitious layer 2.

Adhesion promoters or primer coatings consisting of starches, gelatin, latex, polyvinyl alcohol or polyvinyl acetate may be applied to the backing 1 prior to applying the foamed cementitious layer 2. The primer coating may be applied immediately before use or applied to the substrate and dried until such time as needed. Concentrations of the aqueous primer coatings are from about 1% to about 10% by weight. An about 1% to about 5% by weight solution of polyvinyl alcohol and/or polyvinyl acetate is preferred.

While applicants have set forth embodiments illustrated and described above, it is recognized that variations may be made with the respect to the relative weight percentages of various constituents in the inventive composition. Therefore, while the invention has been disclosed in various forms, it will be obvious to ordinarily skilled artisans that many additions, deletions and modifications can be made therein without departing from the spirit and scope of this invention and that no undue limits should be imposed thereon except as set forth in the following claims.

What is claimed is:

1. An acoustically absorbent porous panel comprising:
   a foamed cementitious layer formed from an uncured aqueous foamed cementitious material comprising on a wet basis about 53% to about 68% by weight cement, about 17% to about 48% by weight water, about 0.05% to about 5% by weight fiber, and about 0.01% to about 10% by weight surfactant selected from a group consisting of amphoteric, anionic, and nonionic surfactants having a hydrophobic portion containing 8 to 20 carbons;
   pores distributed within the cured material comprising about 75% to about 95% by volume of the layer;
   wherein the pores have an average size from about 50 $\mu$m to about 200 $\mu$m, and are open to other pores creating pathways through the cementitious material whereby sound can be absorbed; and
   a backing layer affixed to the foamed cementitious layer.

2. The acoustic panel of claim 1, wherein the uncured foamed cementitious material comprises on a wet basis about 53% to about 63% by weight cement.

3. The acoustic panel of claim 1, wherein the backing is sufficiently stiff as to function as a carrier for the foamed cementitious material prior to being cured.

4. The acoustic panel of claim 1, wherein the acoustic panel is an acoustic ceiling tile.

5. The acoustic panel of claim 1, wherein the foamed cementitious layer is substantially free of aggregate.

6. The acoustic panel of claim 1, wherein the foamed cementitious layer is substantially free of external binder.

7. The acoustical panel of claim 1, wherein the backing layer is selected from the group consisting of paper, scrim, paperboard, felt, fiberglass batt, mineral wool batt and mineral fiberboard.

8. The acoustically absorbent porous panel of claim 1, wherein the uncured aqueous foamed cementitious material comprises on a wet basis about 54% to about 61% by weight cement, about 32% to about 44% by weight water, about 0.1% to about 3% by weight fiber, and about 0.5% to about 5% by weight surfactant.

9. The acoustically absorbent porous panel of claim 1, wherein the foamed cementitious material also contains about 1% to about 10% by weight calcium silicate.

10. The acoustically absorbent porous panel of claim 9, wherein the calcium silicate is wollastonite.

11. The acoustically absorbent porous panel of claim 1, wherein the cement is selected from the group consisting of gypsum cement, portland cement, sorrel cement, slag cement, fly ash cement, calcium alumina cement and mixtures thereof.

12. The acoustically absorbent porous panel of claim 11, wherein the gypsum cement is selected from the group consisting of calcium sulfate alpha hemihydrate and calcium sulfate beta hemihydrate.

13. The acoustically absorbent porous panel of claim 1, wherein the surfactant is selected from the group consisting of betaine, sultaine, propionate, cocamidopropyl betaine, cocamidopropyl hydroxysultaine, cocoamphoproprionate, sulfate, sulfosuccinate, amine oxide, cocamidopropyl amine oxide, cocamine oxide, lauramine oxide, myristamine oxide, and oleamine oxide.

14. The acoustically absorbent porous panel of claim 1, wherein the surfactant comprises an ethoxylated alkyl phenol.

15. The acoustically absorbent porous panel of claim 1, wherein the foamed cementitious layer has a facing side and a backing side, and a dense skin comprising less than 2% of total thickness of the foamed cementitious layer is formed on both the facing side and the backing side.

16. The acoustically absorbent porous panel of claim 1, wherein the foamed cementitious layer has a density between about 10 lbs/ft$^3$ and about 40 lbs/ft$^3$.

17. The acoustically absorbent porous panel of claim 16, wherein the foamed cementitious layer has a density between about 15 lbs/ft$^3$ and about 35 lbs/ft$^3$.

18. The acoustically absorbent porous panel of claim 17, wherein the foamed cementitious layer has a density between about 20 lbs/ft$^3$ and about 30 lbs/ft$^3$.

19. The acoustically absorbent porous panel of claim 1, wherein the fibers are from about 0.25 inches to about 0.75 inches in length and between about 0.0005 inches and about 0.007 inches in diameter.

20. The acoustically absorbent porous panel of claim 1, wherein the fibers are synthetic organic fibers selected from the group consisting of polyester, polyamide, acrylic, rayon and polyolefin.

21. The acoustically absorbent porous panel of claim 20, wherein the polyester fibers are polyethylene terephthalate fibers.

22. The acoustical panel of claim 1, wherein a primer coating is applied to the backing material.

23. The acoustical panel of claim 22, wherein the primer coating is selected from the group consisting of polyvinyl alcohol, polyvinyl acetate and mixtures thereof.

24. The acoustically absorbent porous panel of claim 1, wherein the Noise Reduction Coefficient of the panel is at least 0.5.

25. The acoustically absorbent porous panel of claim 24, wherein the Noise Reduction Coefficient of the panel is at least 0.6.

26. The acoustically absorbent porous panel of claim 25, wherein the Noise Reduction Coefficient of the panel is at least 0.7.

27. The acoustically absorbent porous panel of claim 1, wherein the uncured aqueous foamed cementitious material comprises on a wet basis about 56% to about 61% by weight cement, about 32% to about 42% by weight water, about 0.28% to about 1.3% by weight fiber, and about 0.7% to about 2% by weight surfactant.

28. An acoustically absorbent porous panel comprising:

a facing layer formed from a cured aqueous foamed cementitious material comprising cement, fibers and surfactant and having a density between about 10 lb/ft$^3$ and about 40 lb/ft$^3$, a Hess rake finger scratch test result of at least 12, a Noise Reduction Coefficient of at least 0.5, and a sag test result of less than 0.15 inches at 90% RH;

pores distributed within the cured material comprising about 75% to about 95% by volume of the layer;

wherein the pores have an average size from about 50 $\mu$m to about 200 $\mu$m, and are open to other pores creating pathways through the cementitious material whereby sound can be absorbed; and a backing layer affixed to the facing layer.

29. The acoustically absorbent porous panel of claim 28, wherein the density of the facing layer is between about 15 lb/ft$^3$ and about 35 lb/ft$^3$.

30. The acoustically absorbent porous panel of claim 28, wherein the facing layer has an indent test result of less than 0.12 inches.

31. The acoustically absorbent porous panel of claim 28, wherein the facing layer has a Hess rake finger scratch test result of at least 18.

32. The acoustically absorbent porous panel of claim 28, wherein the facing layer has a Noise Reduction Coefficient is at least 0.6.

33. The acoustically absorbent porous panel of claim 32, wherein the facing layer has a Noise Reduction Coefficient is at least 0.7.

34. The acoustically absorbent porous panel of claim 28, wherein the facing layer has a sag test result of less than 0.05 inches at 90% RH.

35. The acoustically absorbent porous panel of claim 28, wherein the moisture content of the facing layer is less than 5% by weight water.

36. The acoustically absorbent porous panel of claim 28, wherein the fibers are crimped.

\* \* \* \* \*